United States Patent [19]

Masuda et al.

[11] Patent Number: 6,086,141
[45] Date of Patent: Jul. 11, 2000

[54] BODY STRUCTURE FOR MOTOR VEHICLE

[75] Inventors: Toshio Masuda, Ashikaga; Masayuki Honma, Gunma Pref., both of Japan

[73] Assignee: Fuji Jukosyo Kabushiki Kaisha, Tokyo, Japan

[21] Appl. No.: 09/114,913

[22] Filed: Jul. 14, 1998

Related U.S. Application Data

[63] Continuation of application No. 08/767,295, Dec. 16, 1995, Pat. No. 5,820,204, which is a continuation of application No. 08/510,503, Aug. 2, 1995, abandoned.

[30] Foreign Application Priority Data

Aug. 31, 1994 [JP] Japan .................................... 6-230465

[51] Int. Cl.$^7$ ................................................. B62D 21/15
[52] U.S. Cl. .................... 296/188; 296/189; 296/203.03; 296/209
[58] Field of Search .................................. 296/188, 189, 296/203.03, 204, 205, 209

[56] References Cited

U.S. PATENT DOCUMENTS

| | | | |
|---|---|---|---|
| 1,602,913 | 10/1926 | Leipert | 296/29 |
| 2,301,593 | 11/1942 | Ulrich | 280/788 |
| 2,380,523 | 7/1945 | Hicks et al. | 296/204 |
| 4,068,884 | 1/1978 | Watanabe et al. | 296/204 |
| 4,081,197 | 3/1978 | Ackel | 296/204 |
| 4,470,619 | 9/1984 | Imajyo et al. | 280/808 |
| 4,514,008 | 4/1985 | Watanabe et al. | 296/204 |
| 4,572,571 | 2/1986 | Malen | 296/197 |
| 4,747,636 | 5/1988 | Harasaki et al. | 296/186 |
| 4,892,350 | 1/1990 | Kijima | 296/204 |
| 4,934,751 | 6/1990 | Shimoda | 296/188 |
| 5,042,872 | 8/1991 | Yoshii | 296/203.02 |
| 5,213,386 | 5/1993 | Janotik et al. | 296/29 |
| 5,246,264 | 9/1993 | Yoshii | 296/203.03 |

FOREIGN PATENT DOCUMENTS

| | | | |
|---|---|---|---|
| 1800778 | 10/1970 | German Dem. Rep. | 296/203.03 |
| 3119666 | 1/1982 | German Dem. Rep. | 296/203.01 |
| 61-7473 | 1/1986 | Japan . | |
| 62-39375 | 2/1987 | Japan | 296/209 |
| 62-125956 | 6/1987 | Japan | 296/204 |
| 62-258868 | 11/1987 | Japan | 296/209 |
| 2-283578 | 11/1990 | Japan | 296/209 |
| 4-215574 | 8/1992 | Japan | 296/209 |
| 5-185960 | 7/1993 | Japan | 296/209 |
| 6-211164 | 8/1994 | Japan | 296/203.03 |
| 6-263062 | 9/1994 | Japan | 296/203.03 |
| 6-72787 | 10/1994 | Japan . | |
| 1356112 | 6/1974 | United Kingdom | 296/203.03 |

OTHER PUBLICATIONS

JPO & amp; JAPIO, English Abstract of Japanese Patent 6–270845 dated 1994.
JPO & amp; JAPIO, English Abstract of Japanese Patent 6–263062 dated 1994.
JPO & amp; JAPIO, English Abstract of Japanese Patent 2–141372 dated 1990.
JPO & amp; JAPIO, English Abstract of Japanese Patent 60–259577 dated 1985.
JPO & amp; JAPIO, English Abstract of Japanese Patent 5–97057 dated 1993.
JPO & amp; JAPIO, English Abstract of Japanese Patent 6–211167 dated 1994.

*Primary Examiner*—D. Glenn Dayoan
*Assistant Examiner*—Jason Morrow
*Attorney, Agent, or Firm*—Smith, Gambrell & Russell, LLP

[57] ABSTRACT

A body structure of a motor vehicle includes a roof side rail, a side sill, a center pillar, a floor, a center tunnel and a doubler provided between the side sill and the center tunnel. The doubler has a flat closed cross section formed by the floor and a plurality of U-shaped channels and its lengthwise width is longer than that of the lower end of the center pillar. At the outer end of the doubler there are provided a pillar mating section and a side sill mating section. The doubler is connected by welds at the pillar mating section with the center pillar and at the side sill mating section with the side sill. The center pillar has a yieldable portion thereon and it can absorb an impact energy by bending itself. The center tunnel has a reinforcement panel reinforced from underneath.

8 Claims, 9 Drawing Sheets

BODY STRUCTURE FOR MOTOR VEHICLE

This application is a continuation-in-part of U.S. patent application Ser. No. 08/767,295, filed Dec. 16, 1996 (now U.S. Pat. No. 5,820,204, issued Oct. 13, 1998), which is a continuation of U.S. patent application Ser. No. 08/510,503, filed Aug. 2, 1995 (now abandoned), which applications are entirely relied on and incorporated herein by reference.

BACKGROUND OF THE INVENTION

1. Field of the Invention

The present invention relates to a body structure of a motor vehicle, and in particular, to structures of a center pillar and a floor of a motor vehicle.

2. Prior Art

Generally, as shown in FIG. 14, a center pillar "a" is constituted by a center pillar inner panel and a center pillar outer panel, which form together a closed cross section thereof. Further, the center pillar "a" is connected at the lower end thereof with a side sill "b" having a hollow section extending longitudinally and is connected at the upper end thereof with a roof side rail having a closed cross section extending longitudinally. Further, an inner side of the side sill "b" is fixed to a floor "c", and a cross member "d" is provided transversely on the floor "c". The end portion of cross member "d" is connected at the connecting portion of the center pillar "a" with the inner side of the side sill "b".

As an example of an improvement of the center pillar constituted above, Japanese Utility Application No. Jitsu-Kai-Sho 61-7473 discloses, as shown with a broken line in FIG. 14, a technique where the end portion of the cross member "d" is connected through a bracket "d'" with the lower end of the center pillar "a" so as to transfer a load applied to the lower portion of the center pillar "a" to the cross member "d" with high rigidity, for the purpose of enhancing the entire rigidity of the vehicle body.

Further, generally, since the center pillar is located adjacent to an operator or a passenger on the front seat of the vehicle, the manner of deformation of the center pillar toward the inside of the vehicle has a great influence on the amount of injury inflicted on the passenger or operator in the event of a side impact. That is, in most vehicles, the center pillar is constituted by a thick part (having a large cross section) at the lower portion below the window line and a thin part (having a small cross section) at the upper portion above the window line, and the cross section of the center pillar largely changes at the border of the lower and upper portions. Because of this construction, it is possible that the center pillar will bend near that border at the middle of the center pillar when the vehicle is subjected to a side impact. In this case, since the bending occurs at the middle portion of the center pillar, as shown in FIG. 16, a large amount of deformation of the center pillar is caused toward the inside of the vehicle, and as a result, there is a likelihood that the passenger or operator would be seriously injured.

In order to avoid this disadvantage, the assignee of the present invention has proposed an improved center pillar in Japanese Laid Open Patent Publication No. 6-72787. In this improved center pillar, there is intentionally provided a strength discontinuity portion $1a$, i.e., a portion easy to bend when a side force is applied thereto, at the lower part of the center pillar as shown in FIG. 15. At the initial stage of side impact, only the strength discontinuity portion (referred to as "a yieldable portion" hereinafter) $1a$ bends, and the upper portion of the center pillar does not. As a result, the center pillar is deformed toward the inside of the vehicle with the original configuration substantially retained, and the amount of deformation is relatively small, whereby an impact on the passenger can be minimized.

In order that the center pillar according to this utility model application bends at the yieldable portion $1a$ and is deformed as intended in the event of a side impact, the upper and lower ends of the center pillar, specifically the lower end portion thereof, must withstand an impact load. Therefore, since the aforementioned reinforcement member bracket "d'" is just connected with the lower end of the center pillar, it is insufficient to positively support the impact load.

Further, according to the prior art illustrated in FIG. 14, when a side impact is applied, first the impact load is transferred to a center tunnel through the cross member d and the floor c. Since the center tunnel is relatively weak against a transverse force, although it is strong against a longitudinal force, the center tunnel is collapsed before the center pillar and the side sill are collapsed. That is to say, the whole member, including the center pillar and the side sill, is deformed toward the inside of the vehicle, and the impact energy can not be absorbed effectively.

SUMMARY OF THE INVENTION

Accordingly, the present invention is intended to obviate the above-mentioned disadvantages of the prior art, and it is summarized as follows.

It is an object of the present invention to provide a body structure capable of protecting vehicle occupants from serious injury in the event of a side impact.

It is a further object of the present invention to provide a vehicle body having a simple structure, but being capable of absorbing a large impact energy.

A body structure of a motor vehicle has a roof side rail, a side sill composed of a side sill inner panel and a side sill outer panel, a center pillar connected at an upper end thereof with the side rail and connected at a lower end thereof with the side sill, a center tunnel, and a floor. Further, the center pillar includes a center pillar inner panel and a center pillar outer panel.

In particular, the body structure according to the present invention includes:

a doubler connected by welds at an outer end thereof with the side sill and the center pillar, and further connected by welds at an inner end thereof with the center tunnel, the doubler including a flat closed cross section and a lengthwise width longer than a lengthwise width of the lower end of the center pillar;

a pillar mating section integrally formed with the outer end of the doubler, the pillar mating section welded to the lower end of the center pillar inner panel such that the pillar mating portion covers the lower end of the center pillar inner panel;

a side sill mating section integrally formed with the outer end of the doubler, the side sill mating section welded to the side sill inner panel;

a yieldable portion of the center pillar where the center pillar is easy to bend toward the inside of the motor vehicle in the event of a side impact; and a tunnel reinforcement connected by mechanical fasteners with the center tunnel from underneath so as to form a closed cross section therein.

DETAILED DESCRIPTION OF THE PREFERRED EMBODIMENTS

Embodiments according to the present invention will be described in detail by referring to the accompanying drawings.

Figure 1:
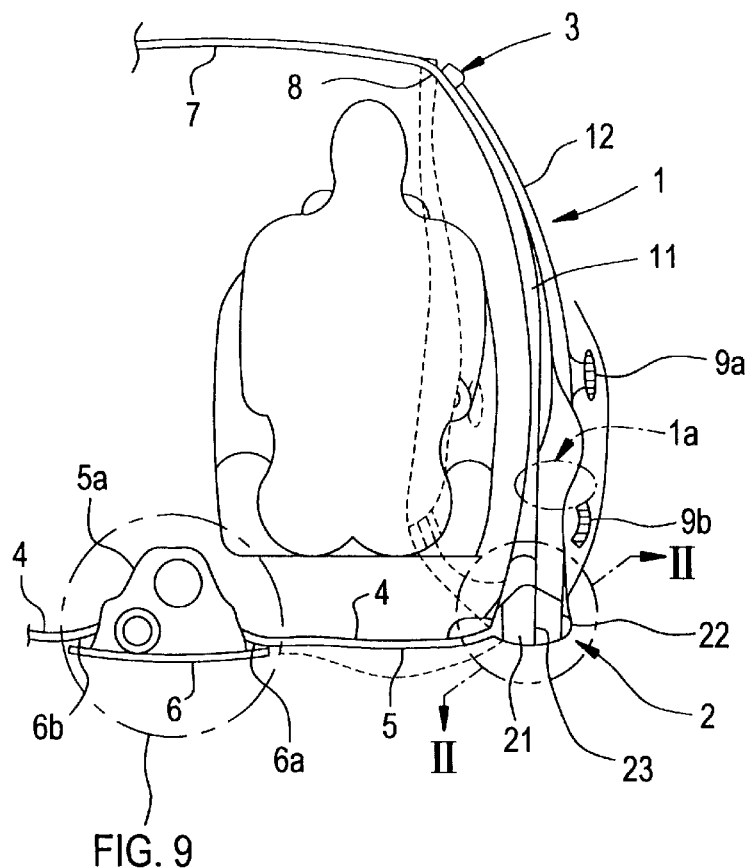
FIG. 1 is a diagrammatic representation showing a first embodiment according to the present invention including a sectional view of a central pillar in accordance with the first embodiment.
Figure 2:
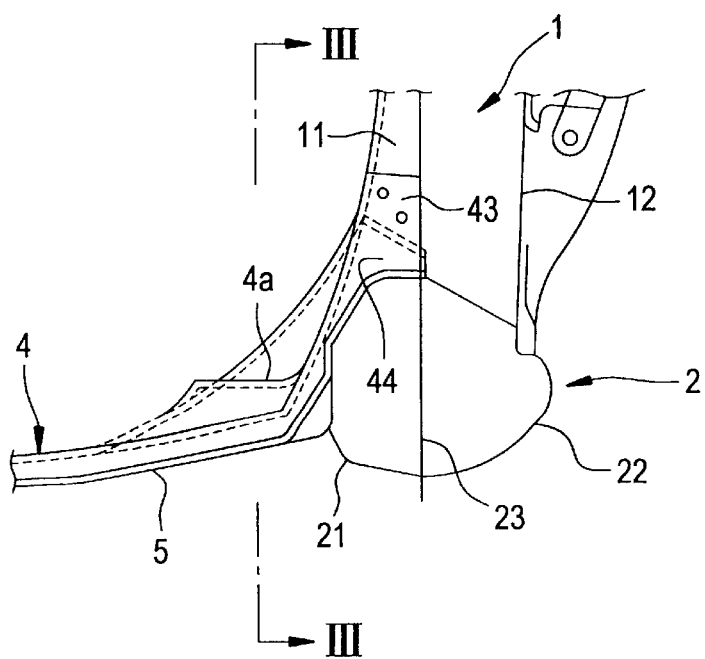
FIG. 2 is an expanded view from the area designated at circle II in FIG. 1.
Figure 3:
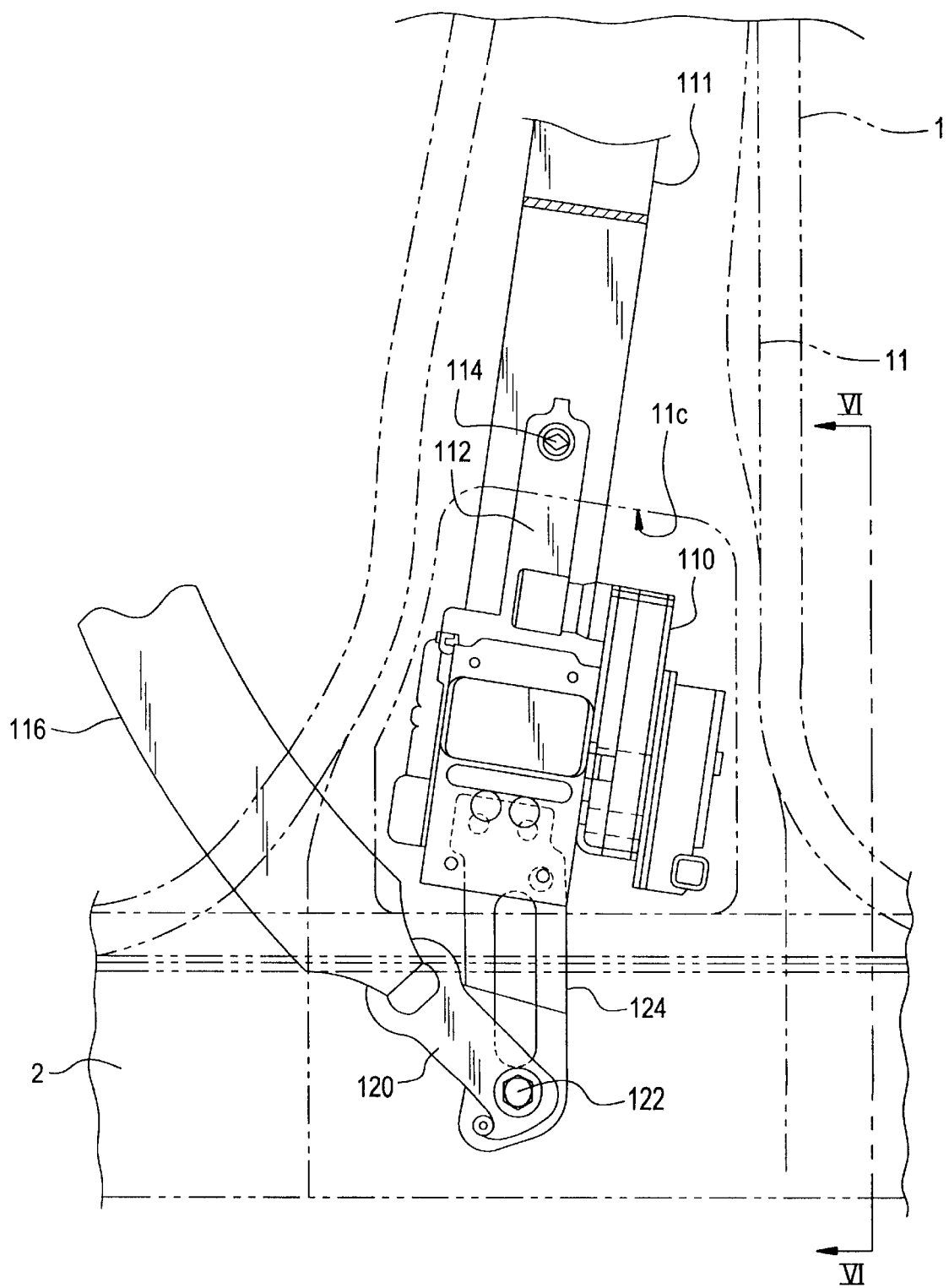
FIG. 3 is an elevational view along line III—III in FIG. 2, depicting the center pillar joined with the side sill.
Figure 5:
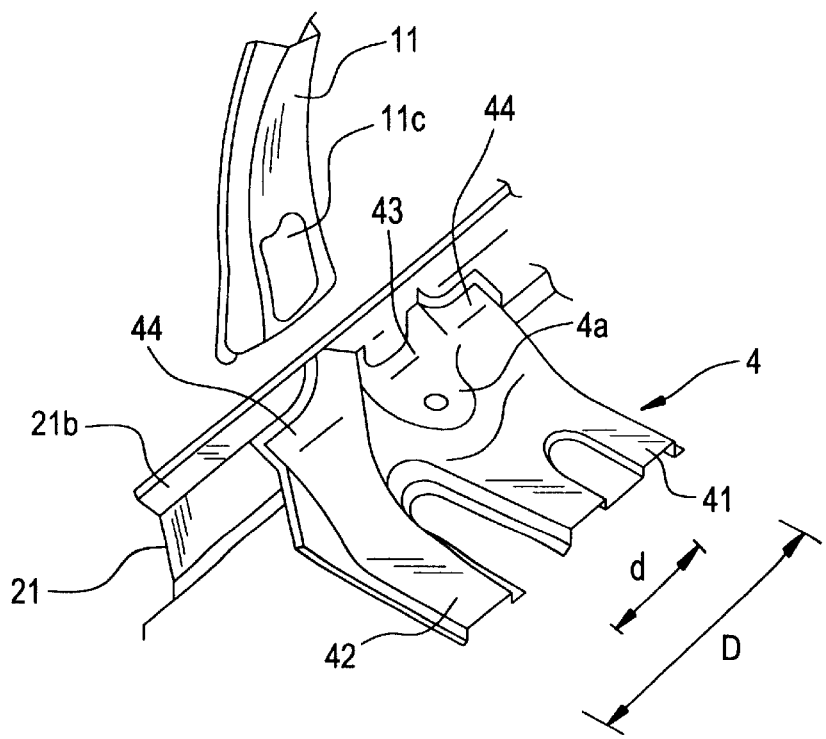
FIG. 5 is an exploded view of the structure depicted in FIG. 2.

Referring now to FIGS. 1 and 2, numeral 1 denotes a center pillar having a center pillar inner panel 11 and a center pillar outer panel 12. FIG. 3 shows that the center pillar 1 may extend at an angle greater than 90 degrees from the front side of a side sill 2. As seen in FIG. 5, the center pillar inner panel 11 forms a closed end for the center pillar 1 below an anchoring hall (anchoring hole or tuning hole) 11c similar to the closed end shown in FIG. 13 of the second embodiment. The center pillar 1 forms a closed cross section in which a reinforcement (not shown) is provided to reinforce the center pillar itself. The center pillar 1 is connected at the upper end thereof with a roof side rail 3 and at the lower end thereof with the side sill 2.

At a predetermined position of the lower part of the center pillar 1, there is provided a strength discontinuity portion or a yieldable portion 1a which is easy to bend in response to an impact force in the lateral direction of the vehicle. The above yieldable portion 1a is located, for example, at an intermediate position between upper and lower door hinges 9a, 9b, or at a position near the lower door hinge 9b. When a side impact is provided on the center pillar 1, the center pillar 1 bends around that yieldable portion 1a toward the inside of the vehicle, as represented by the phantom lines in FIG. 1. Thus, an upper half of the center pillar 1 higher than the middle portion thereof moves uniformly inside without being subjected to deformation. The yieldable portion 1a of the center pillar 1 is formed, for example, by intentionally providing a portion lacking a reinforcement member between the upper half and the lower half of the center pillar 1, as disclosed in the aforementioned Japanese Laid Open Patent Publication No. 6-72787. Furthermore, the anchoring hall 11c is designed in such a way as to fine-tune the bending strength of the center pillar 1 to take advantage of the notch effect principle.

Figure 4:
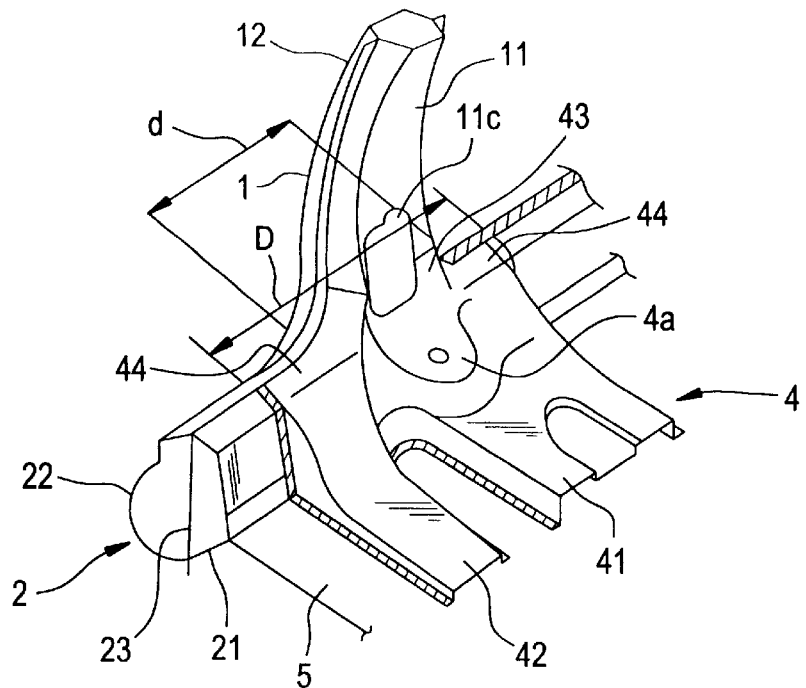
FIG. 4 is a perspective view of the structure depicted in FIG. 2.

In FIGS. 3, 4, and 5, numeral 11c represents the anchoring hall, which is used for anchoring a seat belt retractor 110. This anchoring hall 11c is employed for convenience of attaching the doubler 4 to the lower portion of the center pillar 1 during assembly, and further employed for tuning-up the bending strength of the yieldable portion 1a and the lower portion of the center pillar 1. The anchoring hall 11c provides a cross-sectional change in the center pillar 1 to utilize the concept of a notch effect. The anchoring hall 11c is framed at its lower end by the pillar mating section 43. The pillar mating section 43 covers the center pillar inner panel 11 about the anchoring hall 11c.

Figure 6:
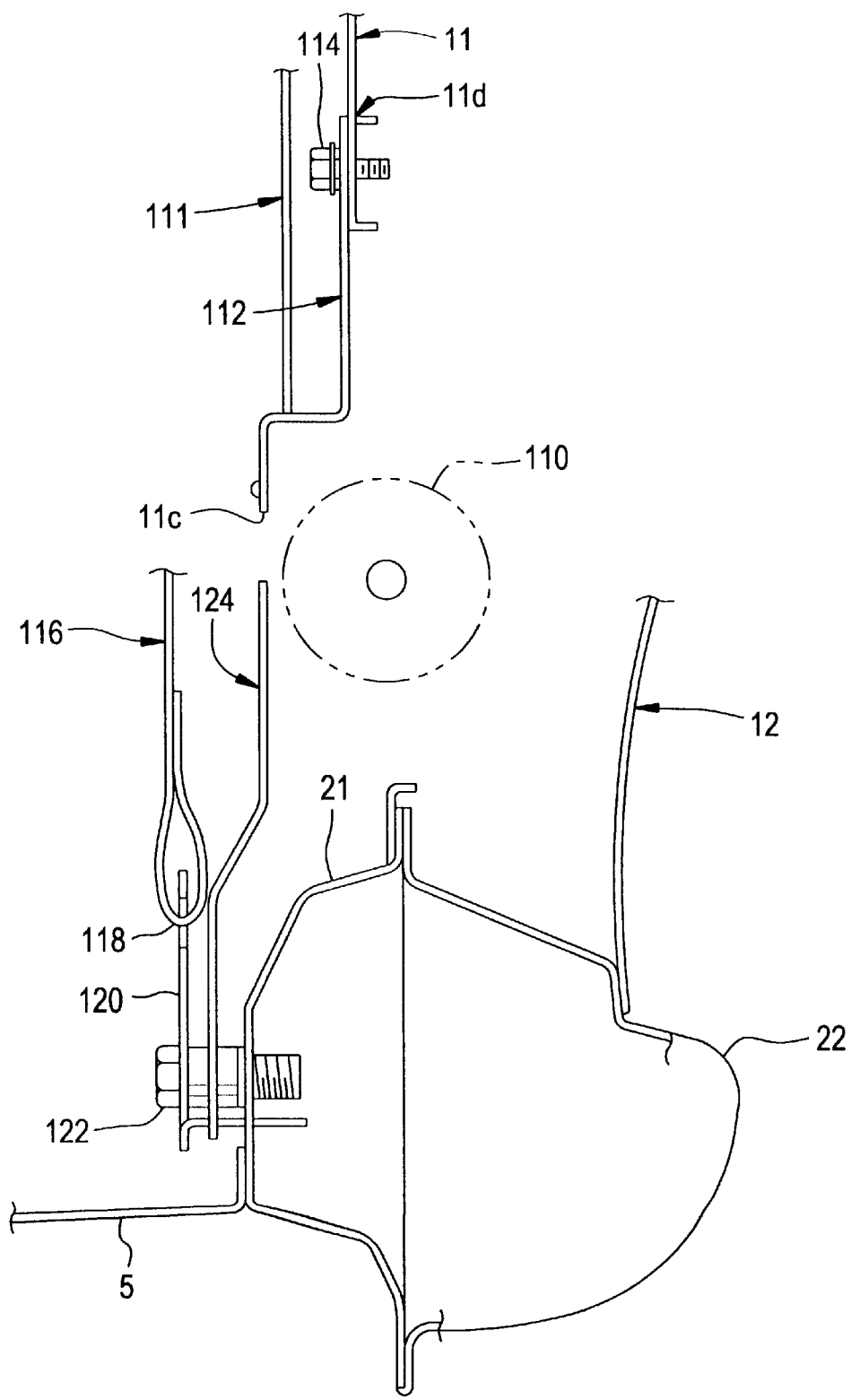
FIG. 6 is an elevational view along line VI—VI in FIG. 3, depicting the anchoring hall.

Referring to FIGS. 3 and 6, the anchoring hall 11c is a recessed area with the center pillar inner panel 11 that provides the connection point for a retractor 110 for a shoulder belt 111. The retractor 110 is held in place by a fixed bracket 112 connected to a small hole lid in the center pillar inner panel 11 just above the anchoring hall 11c. The bracket 112 is held in place by a fastener, bolt, screw, or similar attachment device 114 to prevent rotation or movement of the retractor 110 during use. The lap belt 116 is attached to the side sill inner panel 21 through an eyelet 118 at the end of cantilever or attachment frame 120. The cantilever 120 is attached with a fastener, bolt, screw, or similar attachment device 122 through a bracket 124 that depends from the retractor 110 to the side sill inner panel 21. Alternatively, the lap belt 116 may attach through the cantilever 120 to the mounting boss 4a shown in FIG. 5.

Referring back to FIGS. 1–4, the side sill 2 includes a side sill inner panel 21, a side sill outer panel 22, and a side sill reinforcement 23, and these form a closed cross section. The closed end of the center pillar 1 abuts the side sill inner panel 21. Further, the roof side rail 3 also includes an inner panel and an outer panel, forming a closed cross section.

Figure 7:
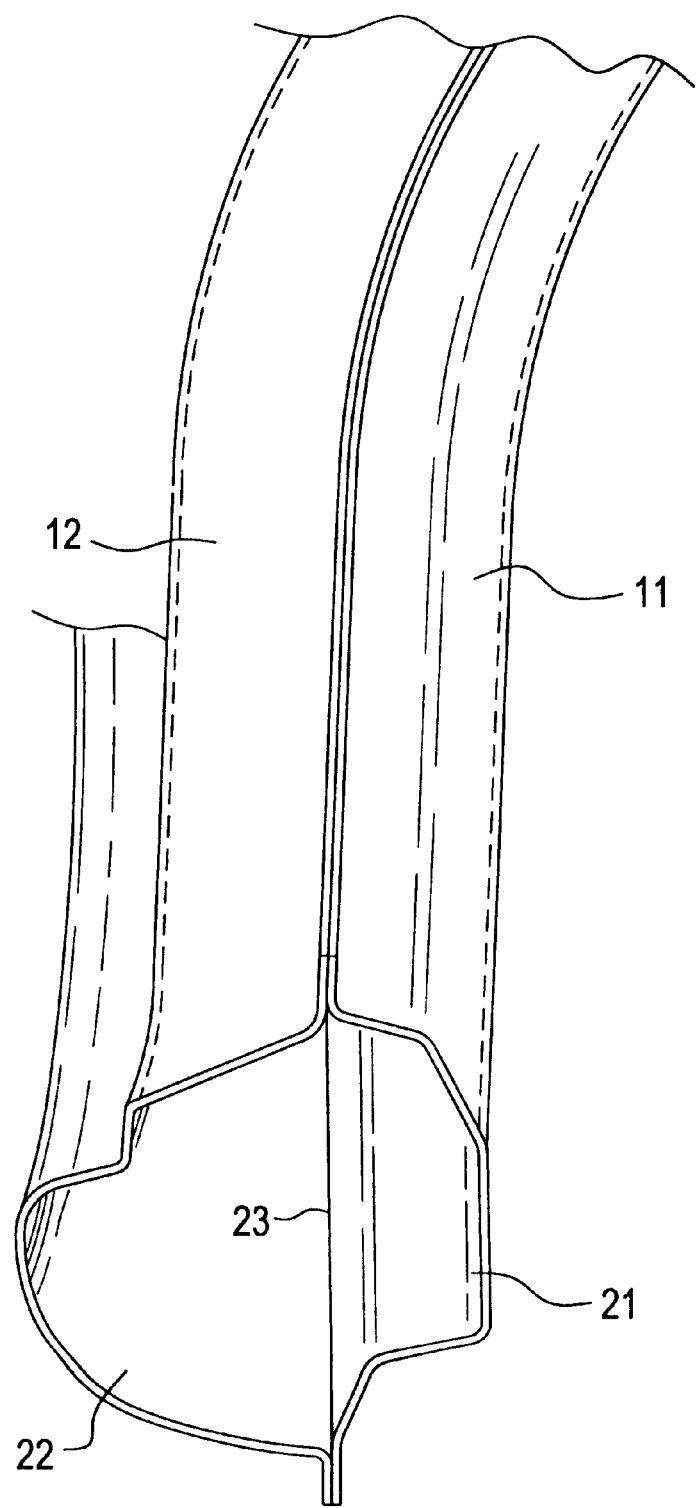
FIG. 7 is a view depicting the inner and outer panels of the center pillar joined with the side sill.

Referring to FIG. 7, the side sill inner panel 21 provides a flush surface for the closed end of the center pillar inner panel 11 to attach to during assembly. Likewise, the side sill outer panel 22 provides a flush surface for the bottom end of the center pillar outer panel 12 to attach to during assembly. These four parts meet and form a longitudinal axis at their joining area. FIG. 6 shows a slightly different configuration where the ends of the center pillar inner panel 11 and center pillar outer panel 12 slope downward as they extend to the lateral sides of the side sill 2 to better connect and join with the side sill inner panel 21 and side sill outer panel 22, respectively. As a result, the end of the center pillar inner panel 11 and center pillar outer panel 12 form a V-like shape.

A doubler 4 is fixed on a floor 5 of the vehicle, and it forms a closed cross section in the transverse direction of the vehicle. The doubler 4 has a larger width "D" than a width "d" of a connecting portion of the center pillar 1 with the side sill 2. In this embodiment, the doubler 4 is composed of a front member 41 having two U-shaped channels and a rear member 42 having one U-shaped channel, forming two closed cross sections in the transverse direction of the vehicle with the floor 5.

These front and rear members 41 and 42, respectively, are combined integrally at the outer end of the doubler 4, and the in tegral portion thereof is bent upward in a circular arc and covers the entire portion of the lower sides of the center pillar inner panel 11 in a nesting arrangement with the side sill inner panel 21. The integral portion of the doubler 4 is welded to the center pillar 1 at a pillar mating section 43 and welded to the side sill 2 at a side sill mating section 44. The pillar mating section 43 forms an area or space in which to nest the center pillar inner panel 11 of the center pillar 1. Thus the center pillar 1 is able to rest within the pillar mating section 43. Further, at the bottom of the circular arc of the doubler 4 there is provided a mounting boss 4a for mounting a front seat. The end of the doubler 4 at the center side of the vehicle is butt-welded to a center tunnel 5a.

Figure 8:
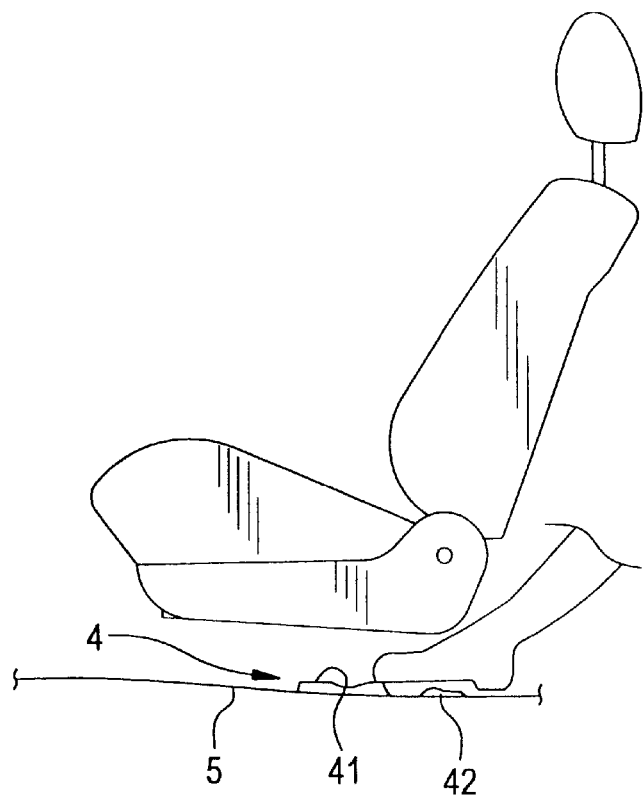
FIG. 8 is an elevational view of a doubler in accordance with the invention.

The height of the U-shaped channel of the rear member 42 is determined such that it is low enough to not hinder the passenger's feet as illustrated in FIG. 8. Further, since the necessary strength of the doubler 4 according to this embodiment is secured by increasing the cross section area by broadening the width of the doubler 4, the height of the U-shaped channel of the front member 41 can be lowered to a level that does not hinder the passenger's feet.

The side sill mating section 44 is located on the front and rear sides of the pillar mating section 43 along the side sill 2. The difference between the widths of the side sill mating section and the pillar mating section is D–d, as shown in FIG. 4. This difference D–d is greater than two times a distance between the upper surface of the side sill and a top of the upper end portion of the doubler.

Figure 9:
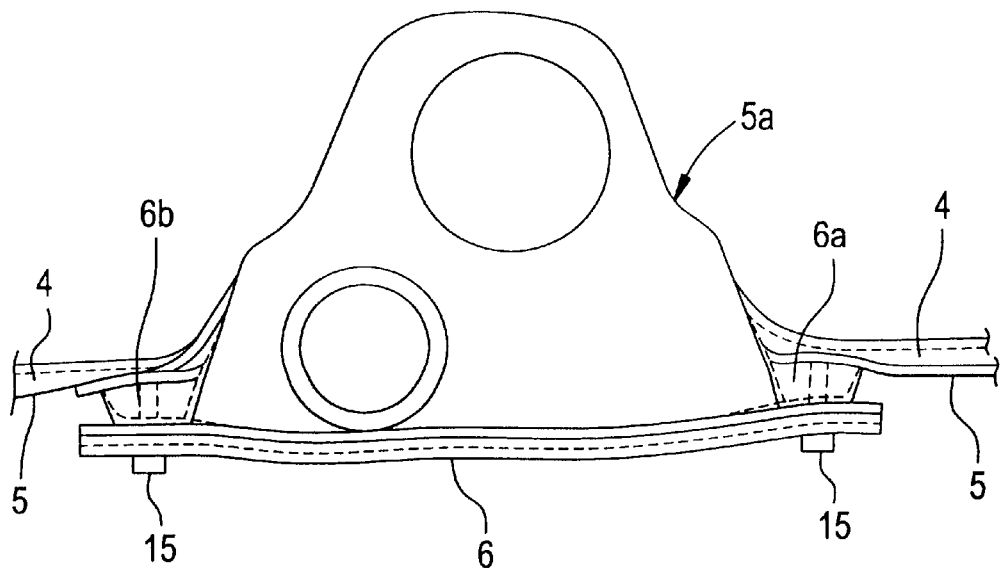
FIG. 9 is an enlarged view of the center tunnel from the area designated at circle IX in FIG. 1.

As shown in FIG. 9, a tunnel reinforcement 6 is formed with a closed cross section in conjunction with the center tunnel 5a. The tunnel reinforcement 6 also connects the left and right doublers 4, 4. That is, in an assembly process, left and right brackets 6a, 6b are welded to the left and right doublers 4, 4 respectively, and left and right ends of the tunnel reinforcement 6 are fastened to the left and right doublers 4, 4 through the bolts 15 mounted on the left and right brackets 6a, 6b, respectively. Bolts 15 attach the tunnel reinforcement 6 to the pair of brackets 6a and 6b on opposite sides of the center tunnel 5a such that the bolts 15 first pass through the tunnel reinforcement 6.

Further, referring to FIG. 1, numeral 7 denotes a roof brace center which forms a closed cross section, and the outer end of the roof brace center 7 is connected with the upper end of the center pillar 1 by a connecting member 8.

When a vehicle has a side impact with another vehicle, the front bumper of the other vehicle crashes into the vehicle near the lower portion of the center pillar 1. Then, the center pillar 1 bends toward the inside of the vehicle around the yieldable portion 1a provided at the predetermined height of the center pillar 1 while the upper portion thereof moves inside with its original configuration retained, whereby injury to the occupants can be greatly alleviated. In this case, whether the predetermined yieldable portion 1a of the center pillar 1 yields or not is dependent upon the strength of the lower end portion of the center pillar 1 and the center tunnel 5a, as described before.

Figure 10:
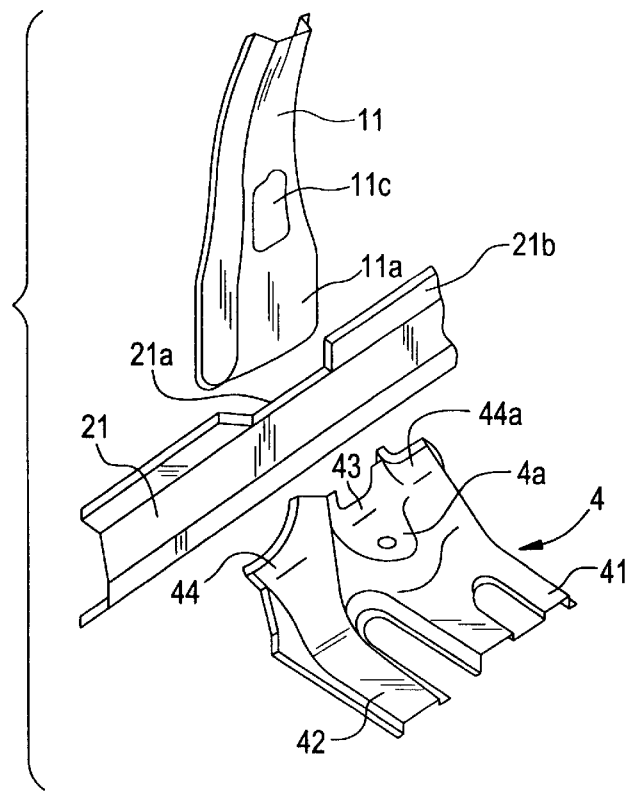
FIG. 10 is a diagrammatic view of a second embodiment according to the invention depicting an exploded perspective view of the lower portion of the center pillar, side sill, and doubler of the second embodiment.
Figure 11:
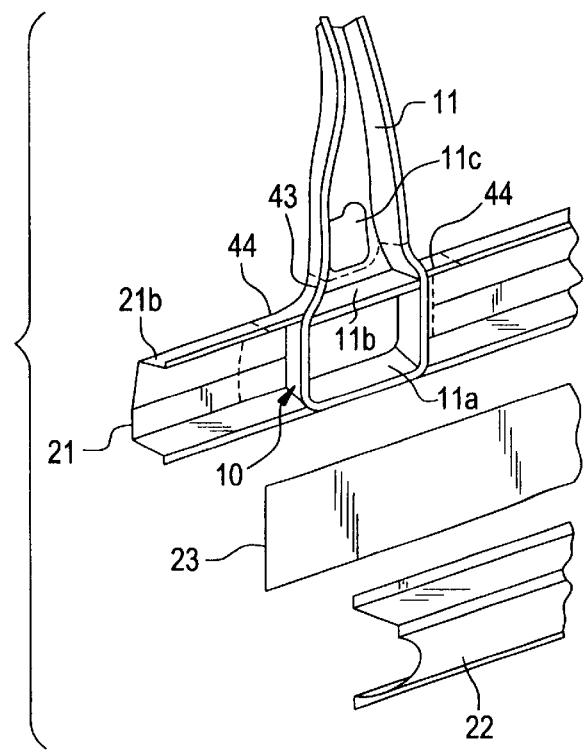
FIG. 11 is an exploded perspective view of a center pillar of the embodiment illustrated in FIG. 10.

FIGS. 10 and 11 illustrate a second embodiment of the present invention wherein a crash box 10 is provided at the connecting portion of the center pillar 1 and the side sill 2. The crash box 10 absorbs the impact energy more effectively in addition to enhancing strength and rigidity of the connecting portion.

Figure 13:
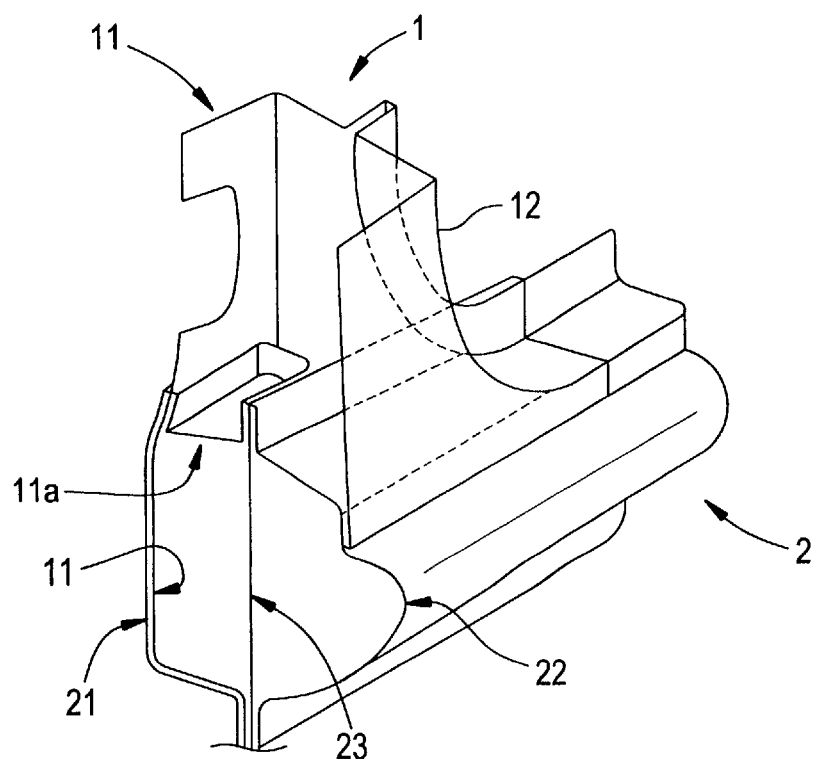
FIG. 13 is a cross-sectional view taken at XIII—XIII of FIG. 12 showing the junction between the center pillar and the side sill.
Figure 14:
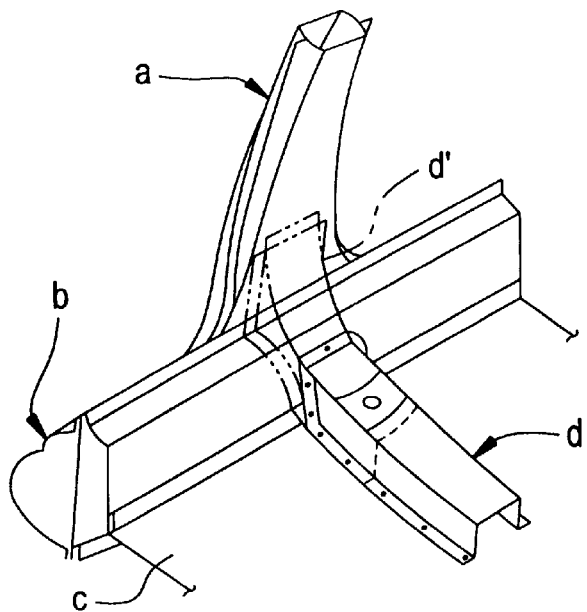
FIG. 14 is a perspective view of a PRIOR ART connecting portion of a center pillar and side sill.
Figure 16:
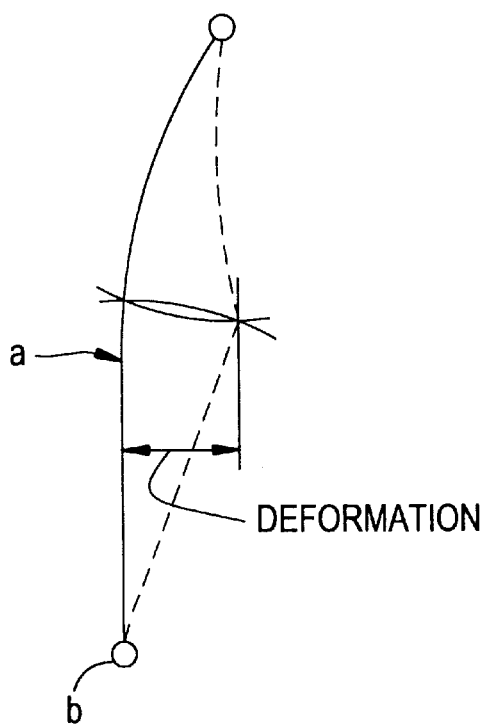
FIG. 16 is a representation of center pillar deformation according to the PRIOR ART.
Figure 15:
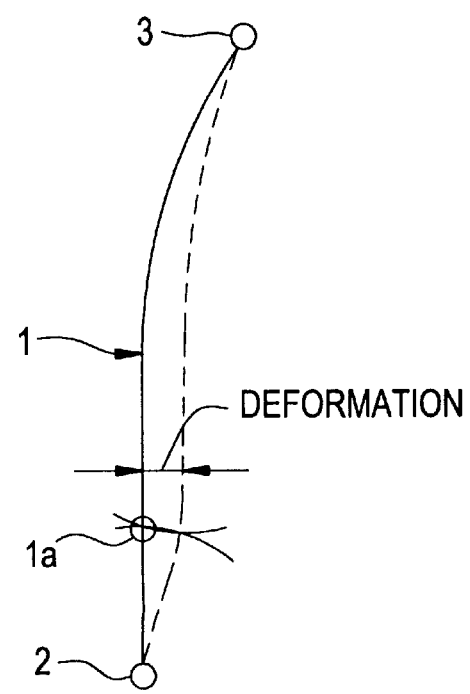
FIG. 15 is a representation of center pillar deformation according to the present invention.

According to the second embodiment, as shown in FIG. 11, a box-like section 11a, separated by a separator 11b, is formed integrally at the lower end of the center pillar inner panel 11. The lateral side walls of the center pillar inner panel 11 form internal walls to separate the crash box 10 from the side sill inner panel 21, as shown in FIG. 13. The box-like section 11a is fitted in a notch 21a provided in the side sill inner panel 21 and welded thereto. Further, the side sill outer panel 22 is put on the side sill inner panel 21 with a side sill reinforcement 23 between them. The side sill is assembled by welding these components together. Thus, a crash box 10 is formed in the closed cross section of the side sill 2. As is seen in FIG. 13, the crash box 10 is formed by the center pillar inner panel 11, the separator 11b, and the side sill reinforcement 23. The doubler 4 is connected with the center pillar 1 in the same manner as in the first embodiment shown in FIG. 1.

Figure 12:
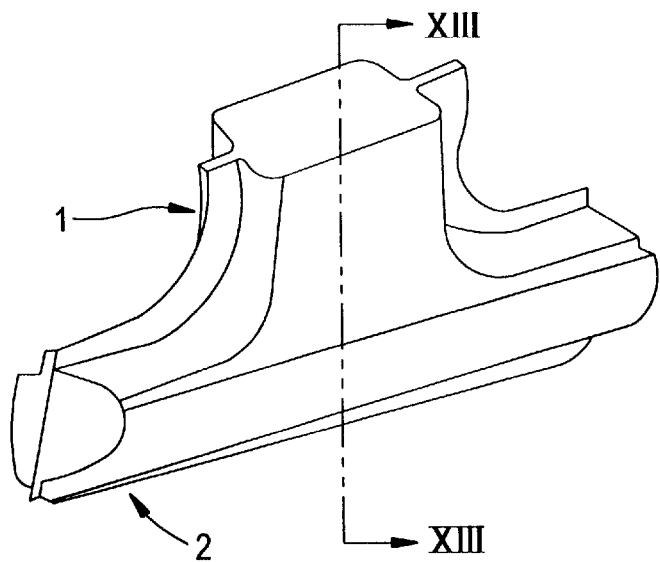
FIG. 12 is an assembled view of the center pillar with the side sill.

The center pillar inner panel 11 extends into the notch 21a of the side sill inner panel 21. The separator 11b is located in the same plane as the top surface 21b. The center pillar outer panel 12, as shown in FIGS. 12 and 13, slopes into its connection with the side sill outer panel 23. The center pillar outer panel 12 is flush with the side sill outer panel 23. The center pillar inner panel 11 has a sloped lateral side area matching that of the center pillar outer panel 12 from an area around the bottom of the anchoring hall 11c to an area around the separator 11b.

The separator 11b provides the point at which the center pillar 1 will bend and then break if there is a side collision. The anchoring hall 11c assists in focusing the collision forces to the separator 11b taking advantage of the principles of the notch effect. Further, in this embodiment, since the yieldable portion 1a of the center pillar 1 and the tunnel reinforcement 6 are constituted in the same way as in the first embodiment, the impact energy is received firmly by the rigid box structure of the crash box 10 at an initial stage of the side impact. The impact energy continues to be absorbed by the crash box 10 until it collapses. Consequently, the absorption of the impact energy can be further improved.

In summary, according to the present invention, there is provided the doubler 4 having a flat and broad closed cross section, provided transversely on the floor 5. The inside end of the doubler 4 is connected with the center tunnel 5a which is reinforced by the reinforcement member. The outside end of the doubler 4 is connected with the lower end of the center pillar 1 such that the wide end portion of the doubler 4 covers both the lower end of the center pillar 1 and a portion of the side sill inner panel 21. Additionally, there is provided the yieldable portion 1a, namely the portion of strength discontinuity against a side impact load, near the lower portion of the center pillar 1. In the body structure thus constituted, when the vehicle has a side impact, initially the impact energy is dispersed broadly to other body structures through the rigid connecting portion of three structure members, the center pillar 1, the side sill 2, and the doubler 4. Finally the center pillar 1 yields at the predetermined portion 1a thereof, thereby effectively absorbing the impact energy. Thus, the present invention provides an excellent vehicle body having a simple structure and capable of protecting vehicle operators and passengers from serious injury.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle body comprising:
   a roof side rail extending along an upper side portion of said vehicle body in a longitudinal direction with respect to the vehicle body;

a side sill extending along a lower side portion of said vehicle body in the longitudinal direction, wherein the side sill includes a side sill inner panel and a side sill outer panel, the side sill inner panel having a top surface and a side surface;

a center pillar interposed between said roof side rail and said side sill at an intermediate position along the longitudinal direction, wherein the center pillar includes a center pillar inner panel and a center pillar outer panel;

a connection member for connecting the center pillar and the roof side rail, wherein the connection member provides a hinge point for the center pillar when the vehicle body is involved in a side impact;

a floor panel extending along an edge of the side sill and along a lower bottom portion of the vehicle body, the floor panel provided for separating a ground surface from a passenger compartment of the vehicle body;

a center tunnel including a first side having a first side wall, a second side having a second side wall, and an upper surface connecting the first and second side walls, wherein the center tunnel is located at a middle portion of the floor panel and extends in the longitudinal direction, and wherein the center tunnel is provided for housing equipment;

a doubler with an U-shaped cross section mounted on said floor panel, wherein an outer end of the doubler overlaps both said side sill inner panel and said center pillar;

a pillar mating section defined at an upper end portion of the outer end of said doubler, the pillar mating section for covering a lower end portion of said center pillar inner panel; a first side sill mating section defined in the outer end of the doubler at a first side of the pillar mating section, wherein the first side sill mating section contacts the top surface and the side surface of the side sill inner panel; and a second side sill mating section defined in the outer end of the doubler at a second side of said pillar mating section, wherein the second side sill mating section contacts the top surface and the side surface of said side sill inner panel;

wherein a width "D" of the doubler along the longitudinal direction from an outside edge of said first side sill mating section to an outside edge of the second side sill mating section is greater than a width "d" of the doubler along the longitudinal direction between outside edges of said pillar mating section; and wherein a cross-sectional height of the doubler along the width "d" is greater than a cross-sectional height of the doubler outside the width "d", to thereby provide a flattened configuration to the doubler, such that the doubler more easily collapses when said vehicle body is subject to a side impact as compared to a middle portion of said center pillar, so as to protect a passenger in the passenger compartment by absorbing shock and providing augmented room in the passenger compartment.

2. The vehicle body according to claim 1, wherein said doubler includes a front member and a rear member, and wherein said rear member has an U-shaped cross section.

3. The vehicle body according to claim 2, wherein said doubler in combination with the floor panel forms a closed section.

4. The vehicle body according to claim 1,
wherein an inner end of said doubler abuts one of the first side wall or the second side wall of said center tunnel; and
wherein the vehicle body further includes a tunnel reinforcement covering an underside of said center tunnel and connected with said inner end of said doubler for reinforcing said vehicle body.

5. The vehicle body according to claim 4, further including:
a first bracket located on the first side of said center tunnel and connected to said floor panel and said tunnel reinforcement; and
a second bracket located on the second side of the center tunnel and connected to the floor panel and the tunnel reinforcement.

6. The vehicle body according to claim 5, further including:
a first bolt to attach said tunnel reinforcement to said first bracket, wherein the first bolt passes first through said tunnel reinforcement and then into the first bracket; and
a second bolt to attach the tunnel reinforcement to the second bracket, wherein the second bolt passes first through the tunnel reinforcement and then into the second bracket.

7. The vehicle body according to claim 1, wherein said side sill has a closed box cross section formed by the side sill inner panel, which has an U-shaped cross section, and by the side sill outer panel, which has an U-shaped cross section; and
wherein said vehicle body further includes a crash box defined by two lateral side walls of the lower end portion of said center pillar and by a separator plate interposed between said lateral side walls in line with the top surface of said side sill inner panel, the crash box provided so as to absorb collision energy from the side impact.

8. The vehicle body according to claim 1, wherein said center pillar inner panel forms a closed end, and wherein the closed end abuts said top surface of said side sill inner panel.

* * * * *